F. H. Smith. Sheet 1. 3 Sheets.
Bridge
No. 3758. Reissued Dec. 7. 1869.
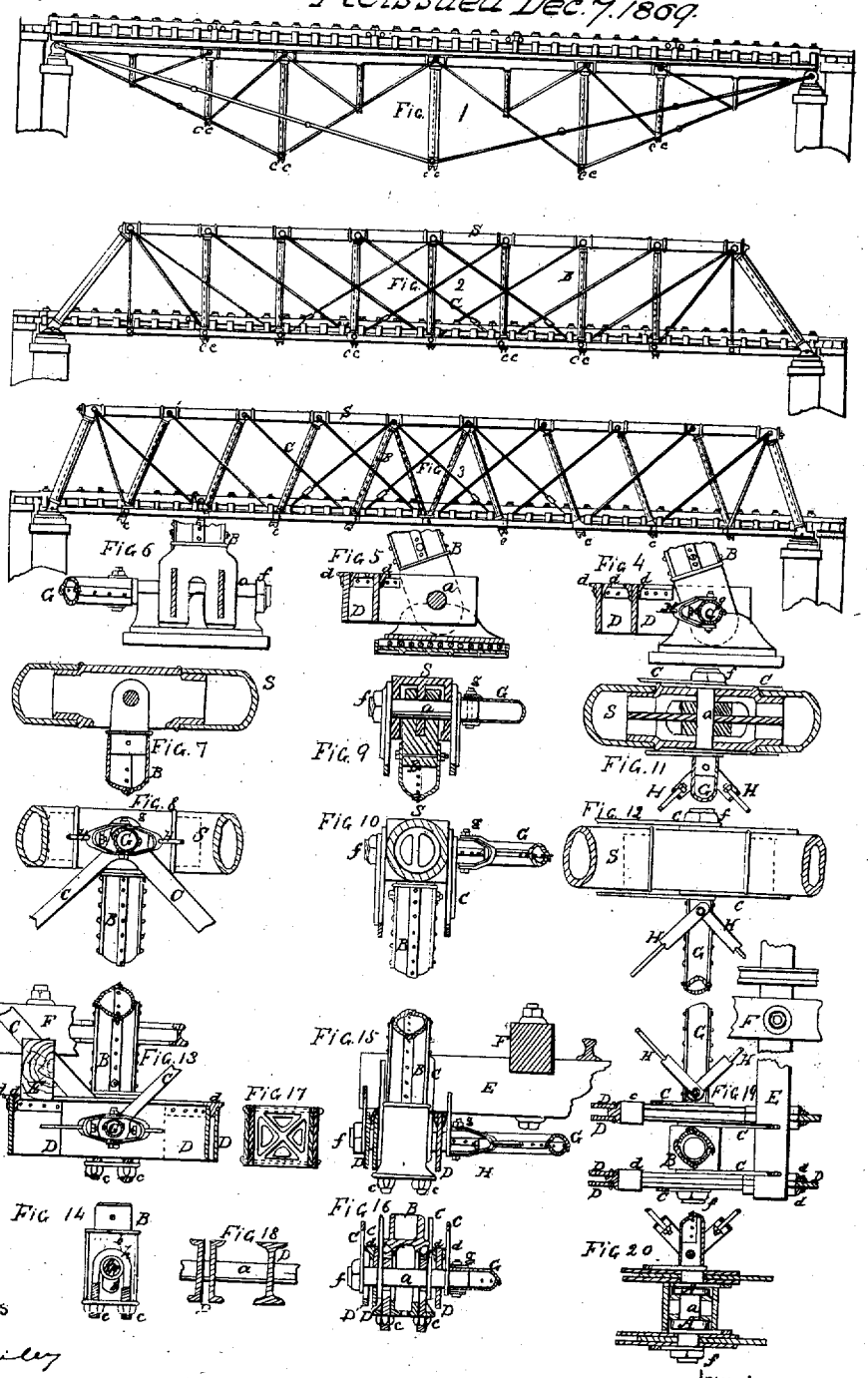
Witnesses
N. Bailey
Inventor
Frederick H. Smith
by his attorney
A. Bell F. H. Smith. Sheet 2. 3 Sheets.

Bridge.

No. 3758. Reissued Dec. 7. 1869.

Witnesses

M. Bailey

Inventor

Frederick H. Smith by his attorney

A. Bellows

F. H. Smith. Sheet 3. 3 Sheets.
Bridge.
No. 3758. Reissued Dec. 7. 1869.
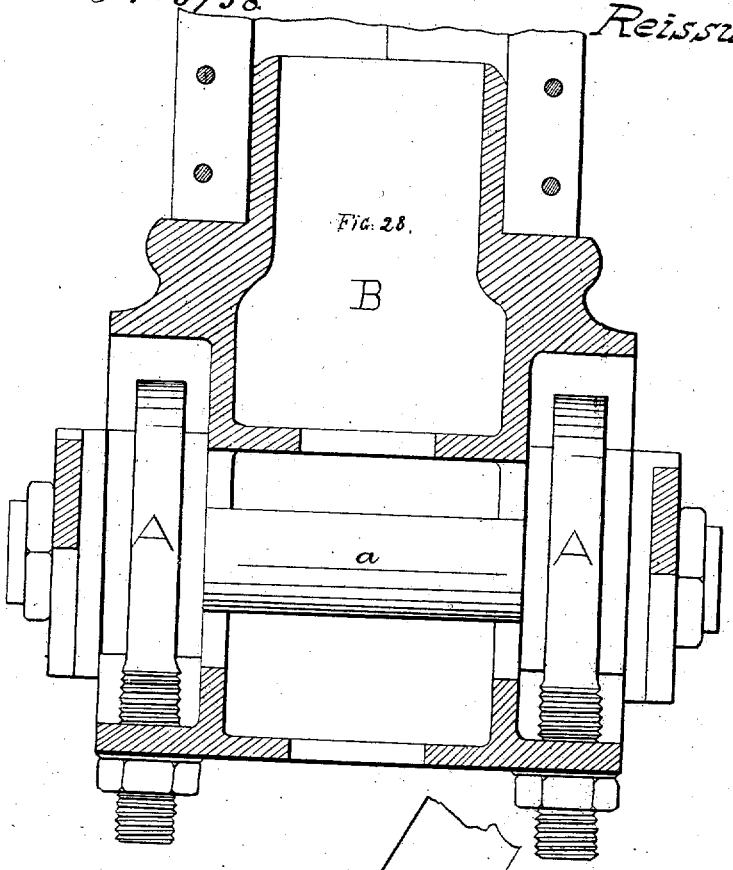
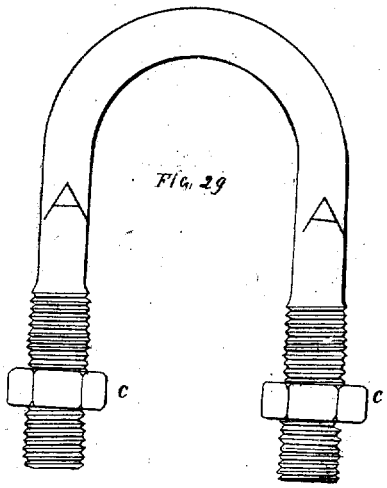
Fig. 27
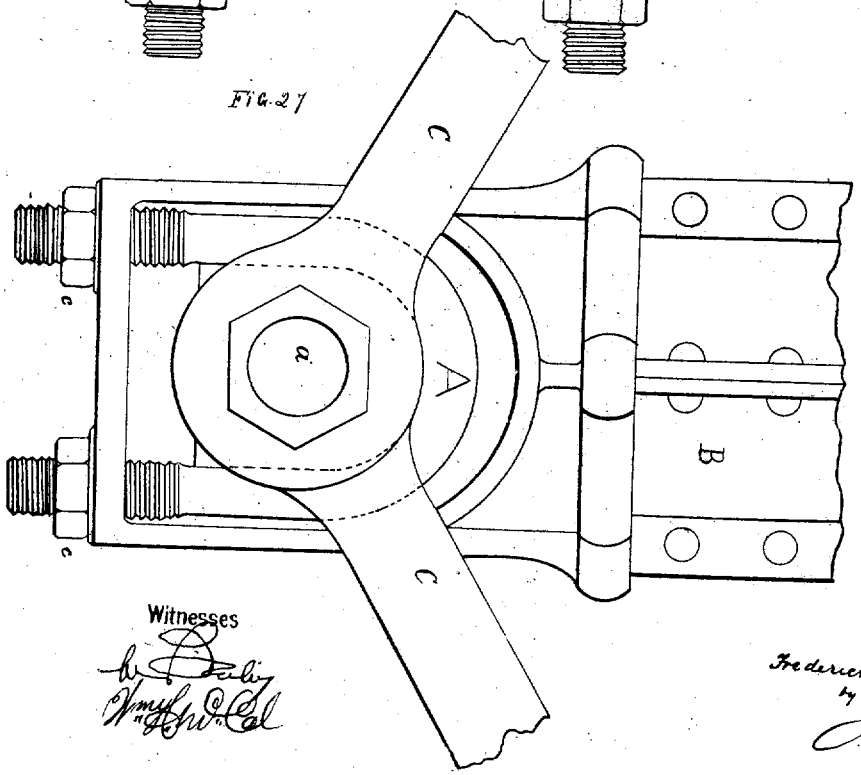
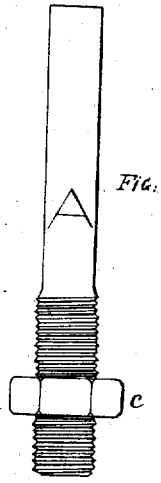
Fig. 30.
Witnesses
Inventor
Frederick H. Smith
by his attorney
A. Pollok

UNITED STATES PATENT OFFICE.

SMITH, LATROBE & CO., OF BALTIMORE, MARYLAND, ASSIGNEES OF FREDERICK H. SMITH.

IMPROVED BRIDGE.

Specification forming part of Letters Patent No. 96,278, dated October 26, 1869; Reissue No. 3,758, dated December 7, 1869.

*To all whom it may concern:*

Be it known that FREDERICK H. SMITH, of the city of Baltimore, county of Baltimore, and State of Maryland, has invented certain new and useful Improvements in the Construction of Bridges and other Truss-Frames; and we hereby declare that the following is a full, clear, and exact description of the same, reference being had to the accompanying drawings, making part of this specification, in which—

Figure 21:
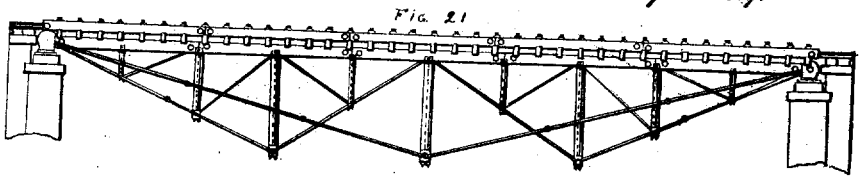
Figure 22:
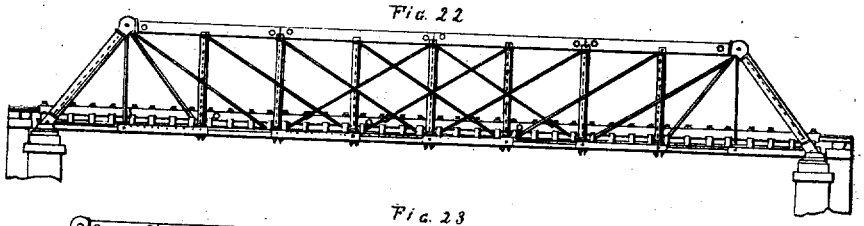
Figure 23:
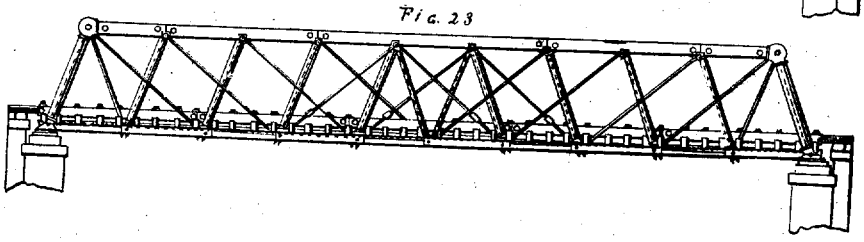
Figure 24:
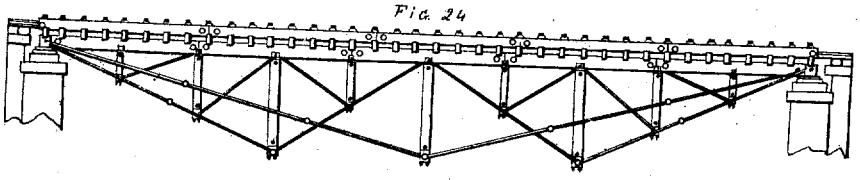
Figure 25:
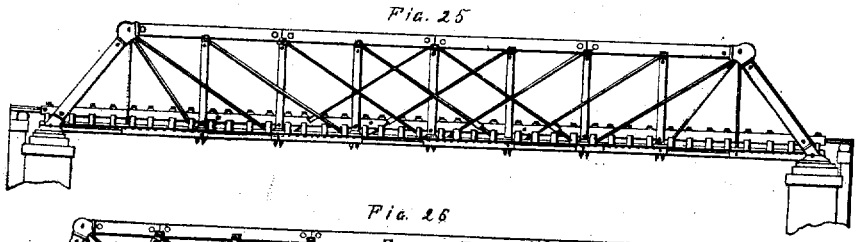
Figure 26:
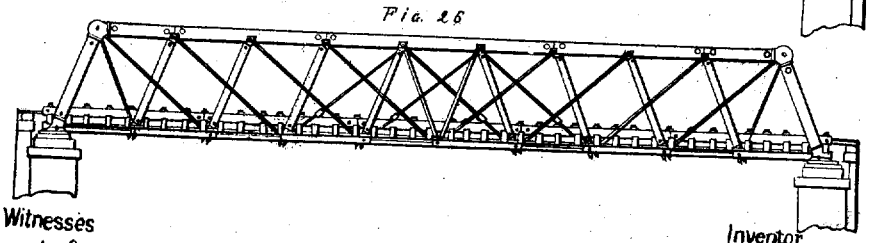

Figure 1 is a side elevation of that form of suspension-truss known as "Fink's." Fig. 2 is a side elevation of a beam-truss of the quadrangular type. Fig. 3 is a side elevation of a beam-truss of the triangular type. Figs. 4, 5, and 6 are side view, section, and rear view of the roller-bed, foot-box, and pin-joint at the end of beam-trusses, showing the attachment of the lateral bracing and bottom chord to the pin. Figs. 7 and 8 are side view and longitudinal section of the top chord at the joint, showing connection of chord, strut, and lateral system at the pin. Figs. 9 and 10 are end views and cross-section through the top chord at the junction of lateral and vertical systems on the pin. Figs. 11 and 12 are top view and horizontal section through the top chord, exhibiting the connections of lateral, vertical, and longitudinal systems. Figs. 13 and 14 are side views of bottom chord and adjusting-loop and foot-box, showing connection of lateral bracing systems to pins, and showing the method of riveting flanges upon the edges of the chord-bars. Figs. 15 and 16 are end views and cross-section through bottom chord, showing flanges riveted to chord-bars, and also connection of lateral systems. Figs. 17 and 18 are cross-sections of bottom chords, showing chord-bars simply stiffened by blocks, and also where the flanges are rolled upon the chord-bar instead of being riveted on. Figs. 19 and 20 are top view and horizontal section of bottom chord, showing connection of pin and laterals. Figs. 21, 22, and 23 are side elevations of the same representative forms of truss, substituting wood for iron in top chord. Figs. 24, 25, and 26 are side elevations of the representative trusses with all compressive strains taken up in wooden struts and top chords, tension-strains in iron. Figs. 27, 28, 29, and 30 are views, on an enlarged scale, of the adjusting-loops and foot-box.

This invention consists in, first, a novel and useful method of adjusting beam-trusses by the use of adjusting devices applied directly to the foot of the strut or post, instead of to the tie, as heretofore has been done, and at the same time securing perfect freedom of action in the truss by using the pin-joint throughout; second, a novel construction of bottom chord-bars, in which no enlargement of ends for eyes is required, as the bars are rolled the full width required for the eye, and then stiffened so as to utilize, for the transverse strain of the load, all of what would otherwise be surplus metal in the bar, the stiffening process also furnishing a perfect bearing for the flooring; third, a novel attachment of the lateral bracing systems to the joint-pins by means of a bolt which passes through the strap-loops inclosing the nuts of the lateral ties, through the strut which fits over the end of the pin, and through the end of the pin itself, thus securing facility of attachment, adjustability, compactness, a hinged joint in the lateral planes of the bridge, and freedom from welds in any of the connections; fourth, a novel device for adjusting trusses of all kinds by means of loops or yokes bent over the pins, and having adjusting-nuts upon each fork of the loops, upon which nuts the bottom plate of the strut is supported at its corners, thus virtually allowing the use of the square-end formula for columns, and giving extreme facility of adjustment and total absence of welds in the manufacture of the loops.

To enable those skilled in the art to make and use this invention, we will describe the manner in which the same is or may be carried into effect.

In a truss composed entirely of wrought-iron economy is secured by concentrating the preponderance of strain in tension, where the material is worth about twelve thousand pounds to every square inch of section, instead of taking it up in compression, where the material is only worth about seven thousand pounds per inch. This fact indicates at once that the struts should be inclined, thus throwing the heaviest strains into the bottom chord, and also shows that the economical angle and consequent reach of the ties are much greater than those of the struts. If the truss is to be raised or lowered by elongating or shortening the tie, as is the usual custom, it is obvious that the resistance to be overcome will be much greater in the greatly inclined tie than in the slightly inclined strut, and the tie is therefore abandoned and the adjustment is applied to the strut, the means of adjustment being directly applied to the base or foot of the strut, thus admitting of the arrangement of the struts not only in a vertical position, but at any desired inclination, as shown in Fig. 3, which would not be practicable were the adjusting devices applied not directly to the strut, but through the flooring system or other intermediary. This at once avoids the necessity of using screws upon the ends of the main ties, thus permitting the use of the pin-joint, combined with complete adjustability throughout the bridge.

The necessity of a pin-joint is seen in the passage of a full-weight train across a three-hundred-feet-span beam-truss, during which the heads of the end struts are drawn about half an inch toward the span center by the contraction of the top chord, while the feet of the same struts are thrown about one inch away from the span center by the elongation of the bottom chord, thus inclining the strut about one and one-half inch from the perpendicular or other original position. This distortion of figure must sooner or later cause the crystallization of the iron, unless a hinge-joint is used. In many bridges the pin-joint is used, but with no adjustment, and the lopsided or sagging condition of most of these structures is the best argument to prove the positive necessity of an adjustment. In this arrangement the chords S are pierced at the joints for the pins *a* to enter, and both struts and ties take hold directly upon the pins, the top chord being recessed, as shown in Figs. 7 and 9, to permit these members to reach up to the pins, which in turn transfer their strain directly to the top chord, and not to the cheeks of the square box inserted into the recess, as is sometimes done. The bottoms of the struts B have slotted holes *b* in them, (see Fig. 14,) or are otherwise forked over the pins of the lower chord, and are supported squarely and firmly upon the nuts of adjusting-loops A A. The adjustment is effected by turning these nuts, thus drawing the pin upward or downward in the slotted hole, and thereby increasing or decreasing the distance between the pins at the different ends of the strut, and virtually making the strut longer or shorter, as may be required.

The ties C also take hold of the pins of the bottom chord, and in common with the strut have full liberty to turn upon the pin.

In constructing the bottom chords of bridges the method usually followed is to use flat bars with enlarged ends to receive the pins, this enlargement being a very expensive process and liable to insecurity from welds, unless the upsetting process is used. In some instances the cross-ties of the bridge have been laid directly upon the edges of these eye-bars, their number being increased to meet the transverse strain; but the general plan is to suspend cross floor-beams from the pins and lay stringers, &c., upon them. This makes it necessary to put the line of lateral bracing below the center line of the cord, and leaves the structure liable to great vibration. In the arrangement herein shown the tension-bars D are not really eye-bars, but are simply rectangular bars of the full width of the eye. The pin-hole is drilled out, and the available section thus left is applied to resist tension-strains in the chord, while the remaining section in the body of the bar, which would otherwise be surplus metal, is used to resist the transverse strain arising from the passage of the load, the bars being stiffened between the points of support in order to resist this strain more effectually, and also to afford a broader support to the cross-ties E than would be offered by the simple edge of the bar. This stiffening is done by riveting flanges *d* to the upper or both edges of the bar, or by inserting packing-blocks between the bars, with bolts or rivets through them, and placing the cross-ties upon them. The flanges can be rolled upon the original bars, as seen in Fig. 18, instead of being riveted to them, if desired.

In long spans, where the chord-strains are very heavy, the amount of surplus metal would be much more than could be utilized were all the bars rolled full width, and in these cases a sufficient number of wide bars is used, and the remainder of the requisite section for tension is made up by placing ordinary eye-bars upon the pin. This arrangement brings the point of application of the transverse load as nearly as possible to the center line of the chord, thus reducing vibration.

It will further be noticed that the tension or chord bars D are arranged alternately in pairs and single bars, the ends of the latter fitting between the ends of the former, and each three ends which thus meet being jointed upon the pins *a*. The bars which are in pairs have an angle or stiffening iron inserted between them, while the single bars have the stiffening-irons on each side. The chord is thus made completely adjustable at any desired point, while at the same time it preserves the strength requisite for the purpose for which it is designed. Heavy guard-stringers F are notched over and bolted down to the cross-ties to perform the double duty of preventing displacement of ties during accidents, and also to distribute the load fore and aft. The pins in both top and bottom chords have screws and substantial nuts *f* upon their outer ends, and their inner ends project several inches beyond the chords, &c. The lateral struts G fit over the projecting ends of the pins. The lateral ties H have screws and nuts upon their ends and pass into straps or loops which fork over the ends of the lateral struts. A bolt, *g*, passes through the loops, strut, and pin, and the whole combination is then drawn up to a tight and compact joint by the nut *f* upon the outer end of pin. The bolt gives freedom of motion for expansion and contraction in sympathy with the motion of the chord, and the lateral ties H are adjusted by means of the nuts upon their ends within the loops.

In order to show the adaptation of the foot adjustment, as used in this arrangement for the beam-truss to a suspension-truss, the points of difference between the loop herein shown and the other devices that have been used in the feet of suspension-trusses will be noted. In the bridge patented and built by Bollman there is a link which closely resembles in appearance the one herein shown, but differs very essentially in the fact that it is composed of a single eye-bar with a screw upon the end, this screw supporting the post directly under its center line, and necessitating the use of the formula for columns with rounded ends. The wedge system used by the patentee of the Fink truss is also open to the same objection, as it supports its load above the pin, and is also liable to fatal displacement of parts by sudden shocks. The loop herein described supports the post at the four corners of the foot-plate entirely below the pin, and the loop itself is simply a bar bent over the pin, requiring no welding, as does the Bollman link. In cases where the diameter of the strut is very great a collar is placed around the pin in order to spread the two arms of the loop apart, and thus obtain the widest possible base of support.

The adjusting-loop and foot-box are represented on an enlarged scale in Figs. 27, 28, 29, and 30. The pin *a* is set in the slotted foot-box of the strut B, and carries on each side the ties C. The loops A fit over the pin, and their lower screw-threaded ends pass down through the base of the foot-box, and are provided with nuts *c c*, by turning which the working length of the strut may be increased or diminished, as before specified.

While preferring the use of the adjusting devices described, other means may be employed for the purpose, they being, however, applied directly to the foot of the strut in all cases.

The construction of the lateral struts may also be varied, the only requisite being that they shall have the jointed connection with the pin, as above specified.

So far as relates to that portion of our claim — viz., the second clause — which embraces the construction of the adjusting devices, we are aware that means resembling in some respects those herein described have been used—as, for instance, in addition to the other cases above named, an adjusting device has been made of a bar, to which the bolt which serves as the pin and the rods which act in some measure as the loops have been firmly secured or welded. We lay no claim to such instrumentalities, but desire to secure only the loops and pin when constructed and combined as above set forth.

Having now described this invention and the manner in which the same is or may be carried into effect, what we claim, and desire to secure by Letters Patent, is—

1. The combination, in a beam-truss, of the strut or post, with the adjusting devices herein described, or their mechanical equivalent, applied directly to the foot or base of said post for the purpose of contracting or elongating its working length, substantially as set forth.

2. The herein-described construction and combination of the loops and pin constituting an adjusting device applied to the foot of the post in either beam or suspension trusses, substantially as shown and set forth.

3. The arrangement of the chord-bars, provided at their upper edge or edges with flanges or stiffening-irons, for the purpose specified, and jointed to the pins upon which their ends are supported, substantially as shown and set forth.

4. The attachment of the lateral bracing-systems to the joint-pins by means of the bolt, which at once combines the pin, strut, loops, and adjustable ties into a hinged joint in the lateral plane of the truss, substantially as shown and specified.

5. The combination, with the feet of the struts or posts, of the adjusting-loops and joint-pins, with which the lateral-bracing system is connected, substantially as herein shown and set forth.

In witness whereof we have hereunto set our hands in the presence of two subscribing witnesses.

SMITH, LATROBE & CO.

Witnesses:
A. POLLOK,
W. FINLEY.